United States Patent [19]

Osberghaus et al.

[11] Patent Number: 5,190,694
[45] Date of Patent: Mar. 2, 1993

[54] ARTICLE FOR SUPPRESSING FOAM AND METHOD FOR SUPPRESSING FOAM

[75] Inventors: Rainer Osberghaus, Duesseldorf; Franz Kresse, Hilden; Bernfrid Scheller, Pulheim, all of Fed. Rep. of Germany

[73] Assignee: Henkel Kommanditgesellschaft auf Aktien, Duesseldorf-Holthausen, Fed. Rep. of Germany

[21] Appl. No.: 613,488
[22] PCT Filed: Apr. 21, 1989
[86] PCT No.: PCT/EP89/00433
§ 371 Date: Dec. 21, 1990
§ 102(e) Date: Dec. 21, 1990
[87] PCT Pub. No.: WO89/10178
PCT Pub. Date: Nov. 2, 1989

[30] Foreign Application Priority Data
Apr. 30, 1988 [DE] Fed. Rep. of Germany ....... 3814707

[51] Int. Cl.$^5$ ............................................. D21H 21/12
[52] U.S. Cl. ....................................... 252/321; 428/12; 428/68; 428/76; 428/236; 428/224; 428/289; 428/913; 206/494; 252/358
[58] Field of Search ............... 428/236, 224, 289, 913, 428/68, 76, 12; 202/264; 252/321, 358; 206/494

[56] References Cited
FOREIGN PATENT DOCUMENTS

| 3013292 | 10/1981 | Fed. Rep. of Germany . |
| 3527089 | 1/1987 | Fed. Rep. of Germany . |
| 3932032 | 4/1991 | Fed. Rep. of Germany . |
| 0010776 | 7/1991 | World Int. Prop. O. . |

OTHER PUBLICATIONS
English translation of German patent 3,527,089, Kresse et al., pp. 1-13.

Primary Examiner—George F. Lesmes
Assistant Examiner—Beverly A. Pawlikowski
Attorney, Agent, or Firm—Ernest G. Szoke; Wayne C. Jaeschke; Daniel S. Ortiz

[57] ABSTRACT

A carrier strip in the form of a nonwoven, woven or knitted fabric made from natural and/or synthetic fibres, for use with foaming detergents, is loaded with antifoam active chemical substances. As a result of its compact packaging and ease of handling, no antifoam substances are released prior to use, prior to contact between the carrier and detergents. To this end, the folded carrier is packed in a sealed water soluble film and deploys its total surface only on contact with the detergents.

18 Claims, 3 Drawing Sheets

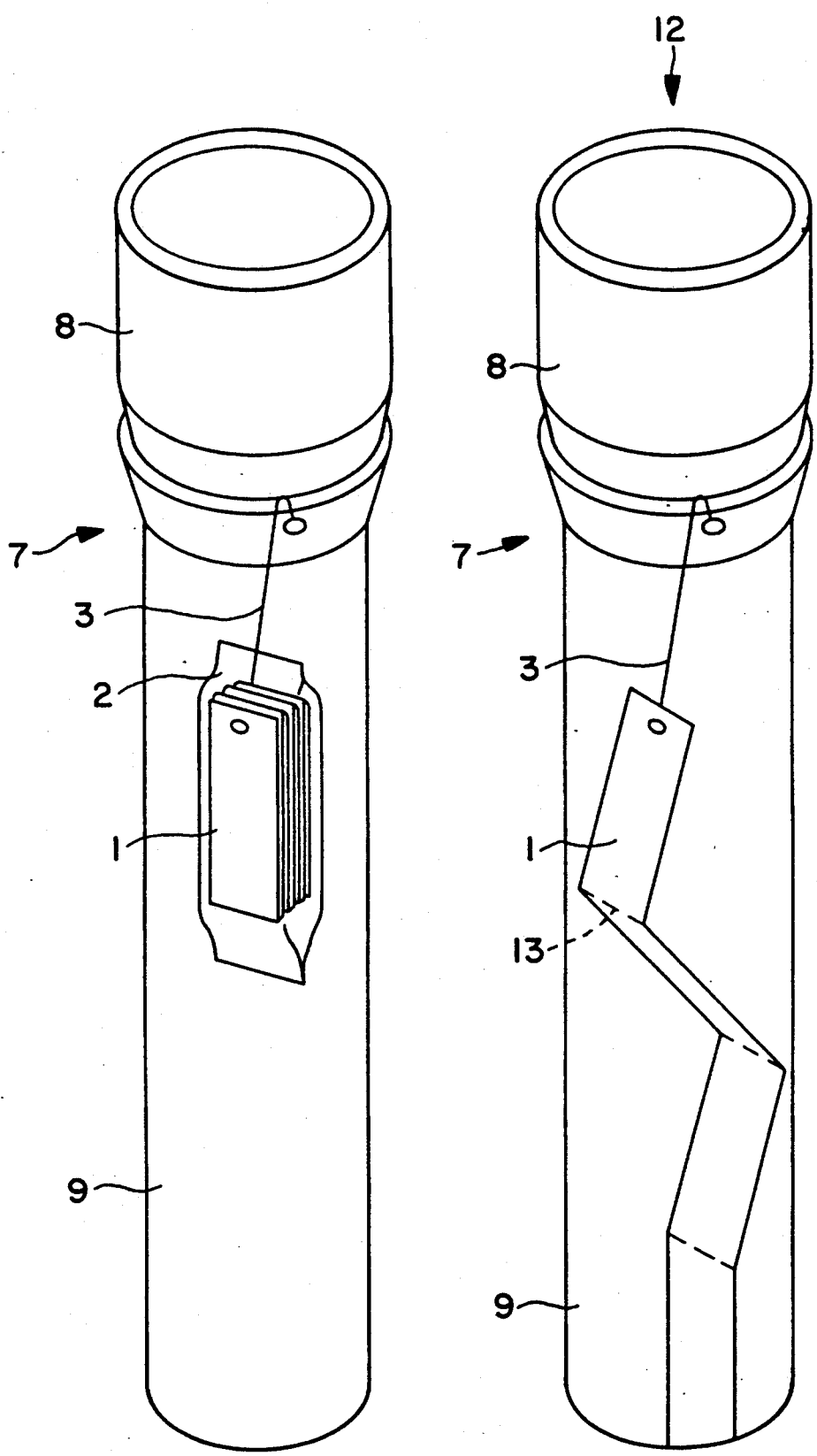

ARTICLE FOR SUPPRESSING FOAM AND METHOD FOR SUPPRESSING FOAM

This invention relates to a strip-form support of natural and/or synthetic fibers in the form of a nonwoven, woven or knitted fabric which is charged with foam-suppressing chemical agents for use with foaming cleaning products.

One such support is known from Applicants' DE-OS 35 27 089. In this case, the support is charged at its surface, for example, with foam-suppressing agents from the group consisting of paraffin oils, waxes, fatty acid esters, trialkyl amines, silicone oils and mixtures thereof. If a support such as this is introduced into a, basically, foaming cleaning liquid or the like, considerably less foaming, if any, occurs.

The packaging of a support of the type in question has so far remained an unsolved problem. Depending on the quantity and nature of the active substance, the support has a moist, tacky or greasy surface, with the result that the support sticks to the packaging material during unpacking or the user comes into skin contact with the active substance during unpacking which can even lead to refusal to purchase the product. In addition, active substances can escape (for example through evaporation) during unpacking of the support so that the useful life of the support is unnecessarily shortened.

The problem addressed by the invention is to provide a solution by which a support of the type in question can be compactly and handily packed before use, i.e. before coming into contact with cleaning products, and is unable to release any foam-suppressing agents before use.

According to the invention, this problem is solved by a support of the type described at the beginning in that, to ensure that it only develops its full effectiveness on contact with the cleaning products, the support is arranged in packed form in a compact, water-soluble film.

Packaging of the support in this way leads to a considerable improvement in its handling properties. When introducing the support into a cleaning appliance or the like, the user does not come into hand contact with the surface charged with active substance, but only with the skin-friendly water-soluble film. This film dissolves on contact with the cleaning product so that the active substance with which the support is charged can be given off to the cleaning product. The fact that the support is packed in the film considerably reduces its space requirement. Under the effect of the flow of the cleaning preparation and its own gravity, the support only unfolds its full surface after dissolution of the film and only then releases its active substance.

In one particularly practical embodiment, the support is longitudinally folded concertina-fashion. This method of folding enables the support to be unfolded particularly quickly and reliably, particularly when it is arranged in a tube through which foaming liquid flows.

In another embodiment, the support is transversely folded in several layers. This embodiment is particularly intended for relatively wide supports to reduce the space requirement in the packed state.

In one particularly favorable embodiment, a fastener projecting from the film is arranged on the support. By means of this fastener, the support can be attached to a certain part of a cleaning appliance or to a certain part of a tube carrying cleaning product. At the same time, after its effectiveness has been exhausted, the support can be removed again without hand contact by means of the fastener.

In one particularly simple and favorable embodiment of the invention, the fastener is in the form of a cord with hooks at its ends. One of the hooks is pushed through the support while the other is used for fastening.

The invention also relates to the use of the support described above for suppressing foam in the intake pipe of a spray extractor. The use of a support packed in this way in such an apparatus is particularly suitable. A floor surface to be cleaned is first sprayed with a cleaning liquid using a spray extractor, after which the cleaning liquid is removed by suction in the same operation. The arrangement of the support in the suction line avoids foaming which would mean that the collecting container of the appliance would be completely filled in a very short time and, accordingly, would have to be continually emptied.

The invention is described by way of example in the following with reference to the accompanying drawings which are all perspective views and in which:

FIG. 2 shows the support after its introduction and before foaming cleaning product flow throughs the intake line.

FIG. 3 shows the same embodiment as FIG. 2 during the flow of the cleaning product.

Figure 1:
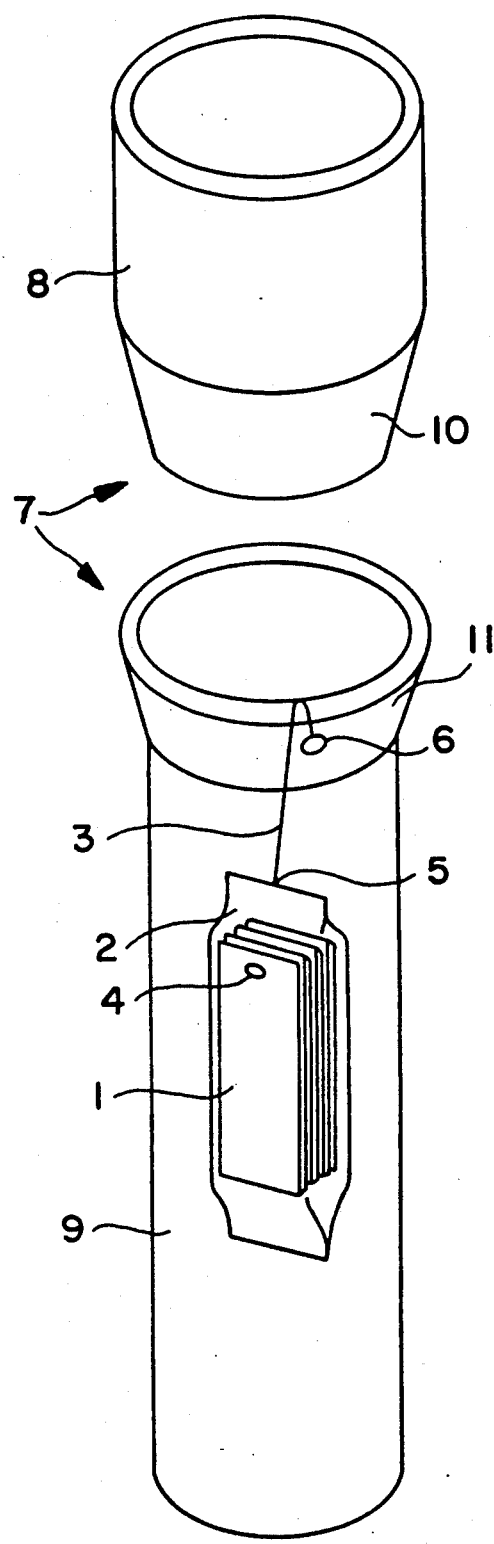
FIG. 1 shows the introduction of a support packed in accordance with the invention into an intake line.

An elongate strip-form support 1 charged with foam-suppressing chemical agents is packed in folded form in a water-soluble film 2. Arranged at one end of the support 1 is a fastening cord 3 which is provided at one end with a hook 4 for fastening to the support 1. The cord 3 is guided out of the film 2, an opening 5 in the film 2 for the cord to pass through being closed by welding so that no air can enter the film 2. Another fastening hook 6 is arranged at the other end of the fastening cord 3.

An intake like 7 of a spray extractor (not shown) consists of two telescoping tubes 8 and 9. The tubes 8, 9 have conical ends 10, 11 for sliding into one another.

To introduce the support 1 into the intake line 7, the two tubes 8, 9 are pulled apart from one another and the support 1 packed in the film 2 is attached to the lower tube by means of the fastening cord 3, as shown in FIG. 1. After this attachment (FIG. 2), the upper tube 8 is inserted with its conical end 10 into the end 11 of the tube 9 so that the support 1 hangs fixedly in the intake pipe 7. The intake line 7 could of course also be arranged in a position differing from the vertical position shown in the drawing.

In FIG. 2, the support 1 is shown in position in the intake line 7, no cleaning product having as yet flowed through the intake line 7. The support 1 is arranged in the film 2 longitudinally folded like a concertina.

FIG. 3 shows the support 1 in the intake line 7 with the cleaning product flowing through in the direction of the arrow 12. Through contact with the cleaning product, the film 2 has dissolved and the support 1 has unfolded longitudinally from its concertina-like folded position (chain-line folds 13) under the effect of the flow.

Figure 4:
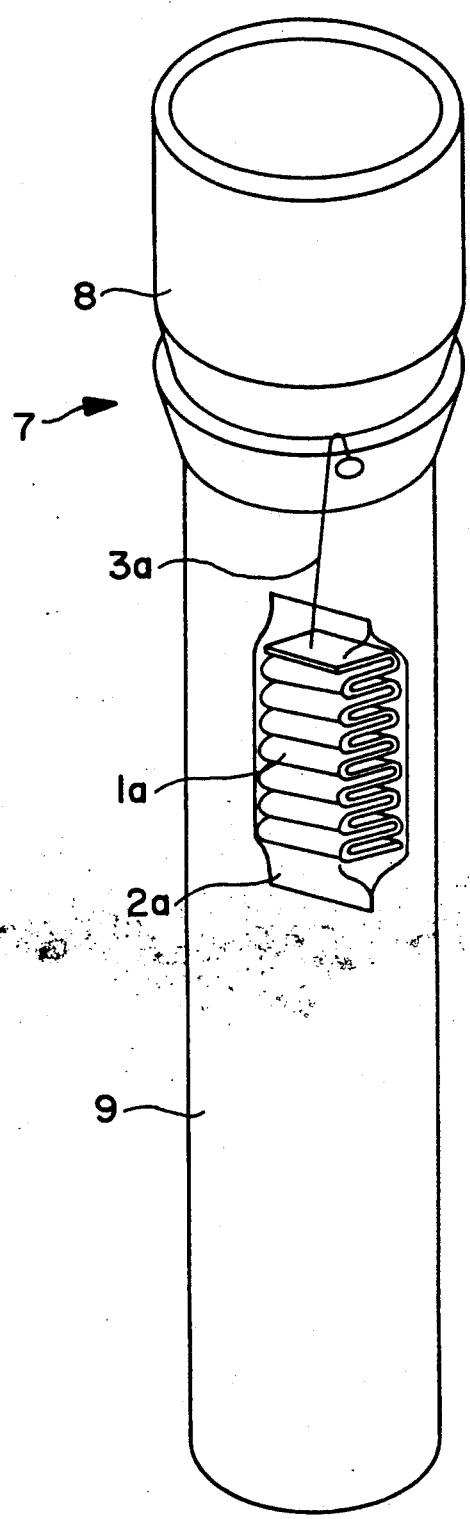
FIG. 4 shows another embodiment of the invention before the flow of the cleaning product.
Figure 5:
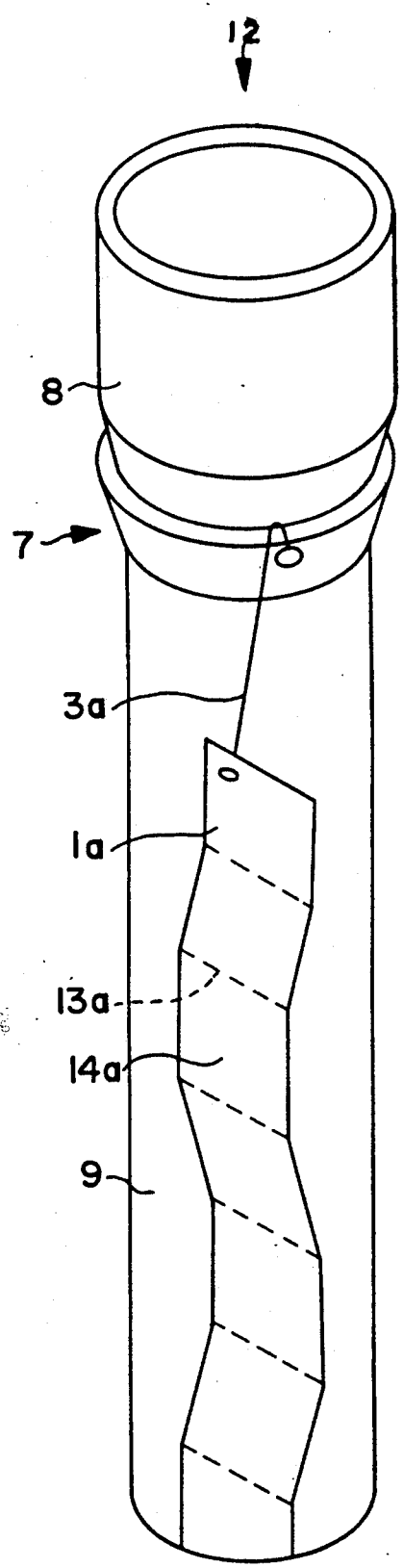
FIG. 5 shows the same embodiment as FIG. 4 during the flow of the cleaning product.

FIGS. 4 and 5 show another embodiment of the support, the reference numerals relating to the support and its pack being provided with the additional index "a". The support 1a which is wider than the support 1 shown in FIGS. 1 to 3 is longitudinally folded like a concertina and, in addition, is transversely folded on one side and is arranged in this position in the film 2a. After the film 2a has dissolved under the effect of the cleaning product (FIG. 5), the support 1a is unfolded by the flow, the position of the original folds being denoted by the chain lines 13a and 14a.

The invention is not of course confined to the embodiments illustrated in the drawing. Other variants of the invention are possible without departing from the basic concept. Thus, the support could also be otherwise arranged in the film, for example in roll form or the like, and so on.

We claim:

1. An article for suppressing foam in an aqueous foaming cleaning composition, which comprises: a natural or synthetic fiber fabric support, charged with a foam suppressing composition, packaged in a water soluble film in a compact form, whereby when the article is contacted with the aqueous cleaning composition, the water soluble film is dissolved and the support releases the foam suppressing composition to the aqueous cleaning composition.

2. An article of claim 1, wherein the support, arranged in the compact form, comprises a support folded transversely into a plurality of layers, concertina fashion.

3. An article of claim 1 wherein the support, arranged in the compact form, comprises a support folded longitudinally into a plurality of layers.

4. An article of claim 2 wherein the support is folded longitudinally into a plurality of layers.

5. An article of claim 1 having a fastener connected to the support projecting from the film.

6. An article of claim 2 having a fastener, connected to the support, projecting from the film.

7. An article of claim 3 having a fastener, connected to the support, projecting from the film.

8. An article of claim 4 having a fastener, connected to the support, projecting from the film.

9. An article of claim 5 wherein the fastener comprises a cord with hooking means.

10. An article of claim 6 wherein the fastener comprises a cord with hooking means.

11. An article of claim 7 wherein the fastener comprises a cord with hooking means.

12. An article of claim 8 wherein the fastener comprises a cord with hooking means.

13. An article of claim 1 wherein the fabric is a fabric selected from the group consisting of knitted, woven or non-woven fabric.

14. A method for suppressing foam in a device in which an aqueous foaming solution, mixed with air, is passed through a conduit, which comprises: arranging an article which comprises a natural or synthetic fiber fabric support, charged with a foam suppressing composition, packaged in a water soluble film in a compact form, in the conduit through which the solution passes; contacting the article with the solution to dissolve the film and place the support in an expanded foam to dispense the foam suppressing composition.

15. The method of claim 14 wherein the support, in the compact foam, comprises a support folded transversely into a plurality of layers concertina fashion.

16. A method of claim 14 wherein the support in the compact form comprises a support folded longitudinally into a plurality of layers.

17. A method of claim 15 wherein the support in the compact form comprises a support folded longitudinally into a plurality of layers.

18. A method of claim 14 wherein the support in the expanded form comprises a strip of natural or synthetic fabric.

* * * * *